Nov. 23, 1965   M. W. FORTH   3,218,993
MACHINE FOR WAFERING HAY AND LIKE FORAGE CROPS
Filed Dec. 6, 1962   3 Sheets-Sheet 1
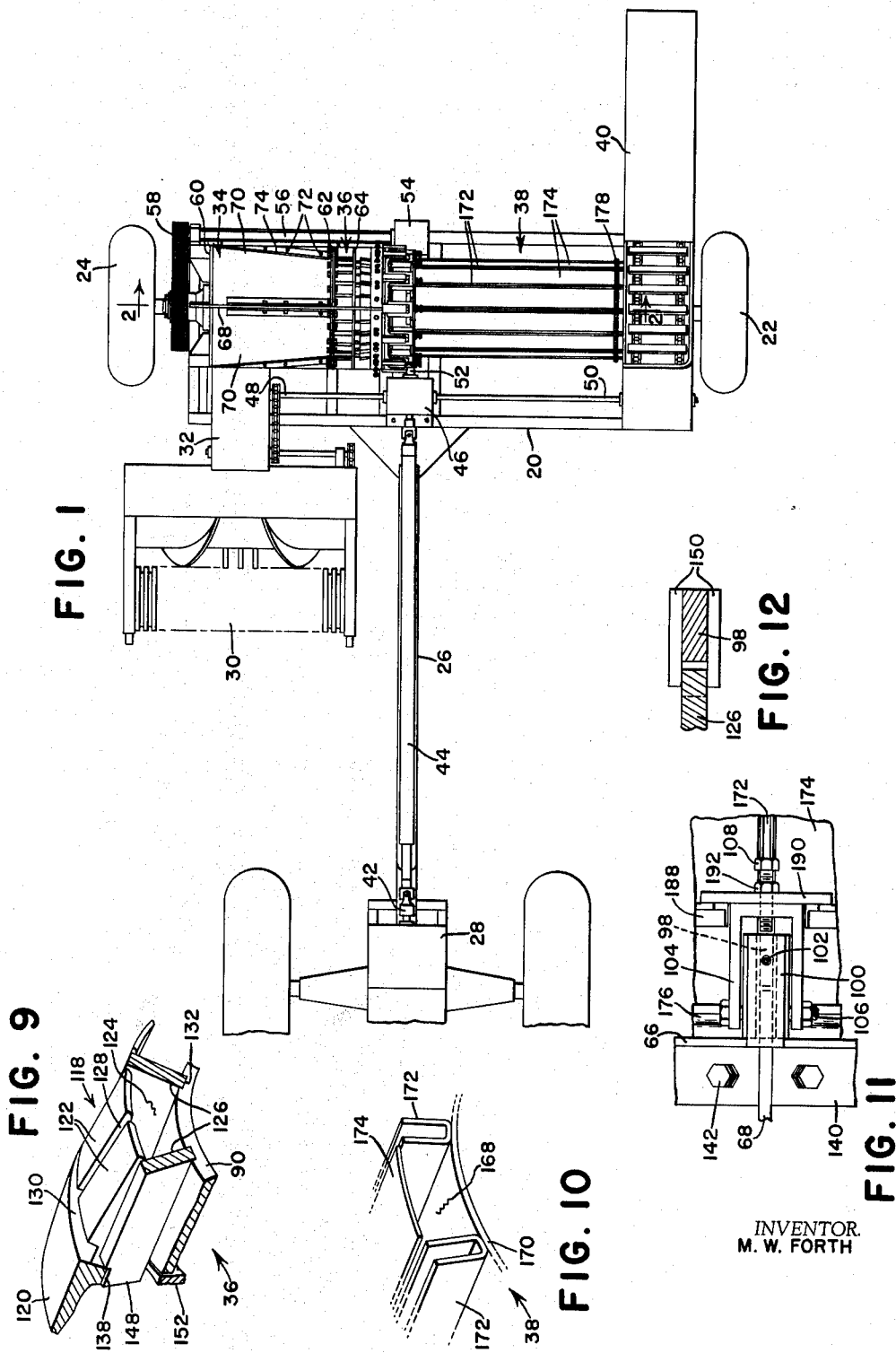
INVENTOR.
M. W. FORTH

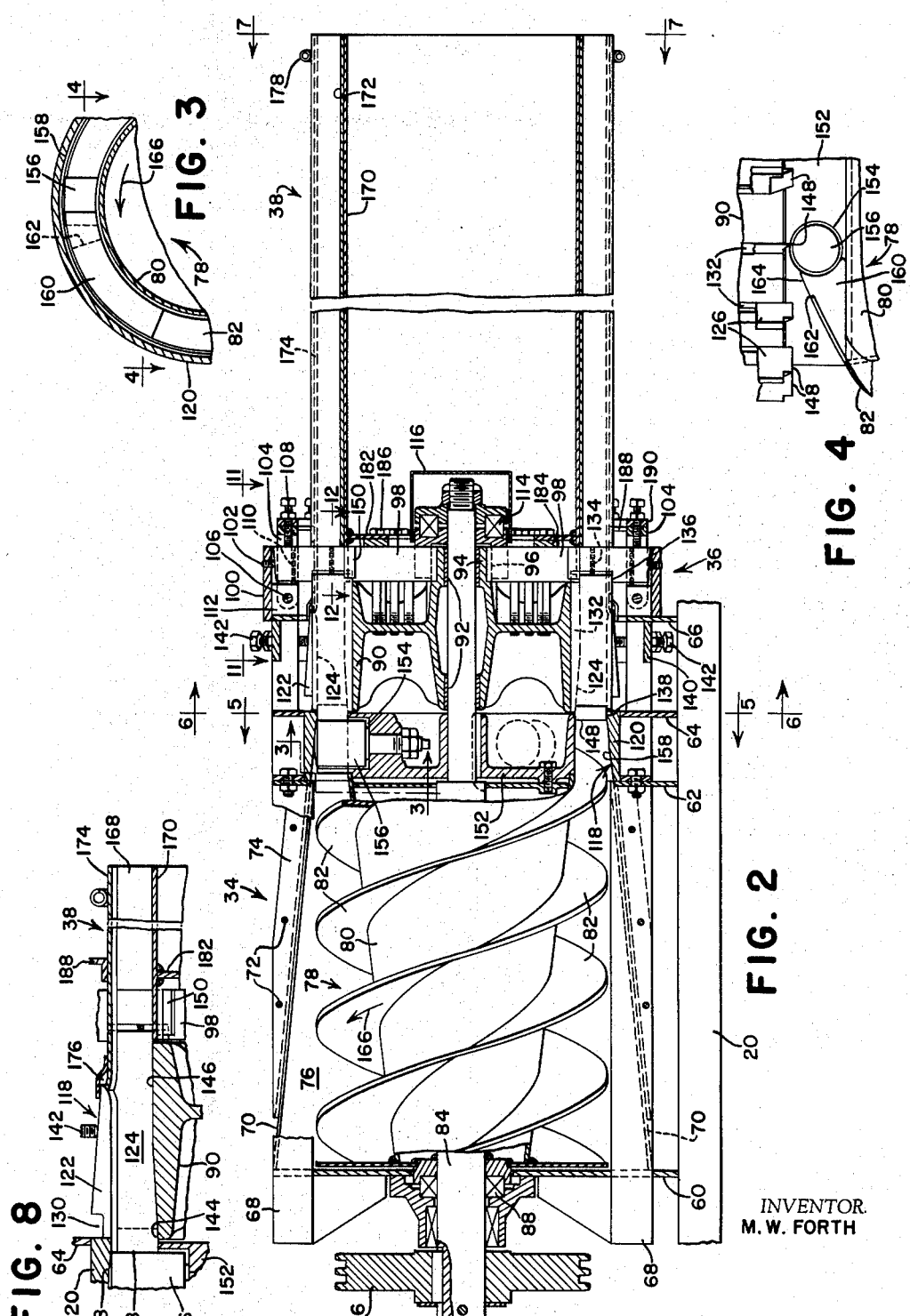

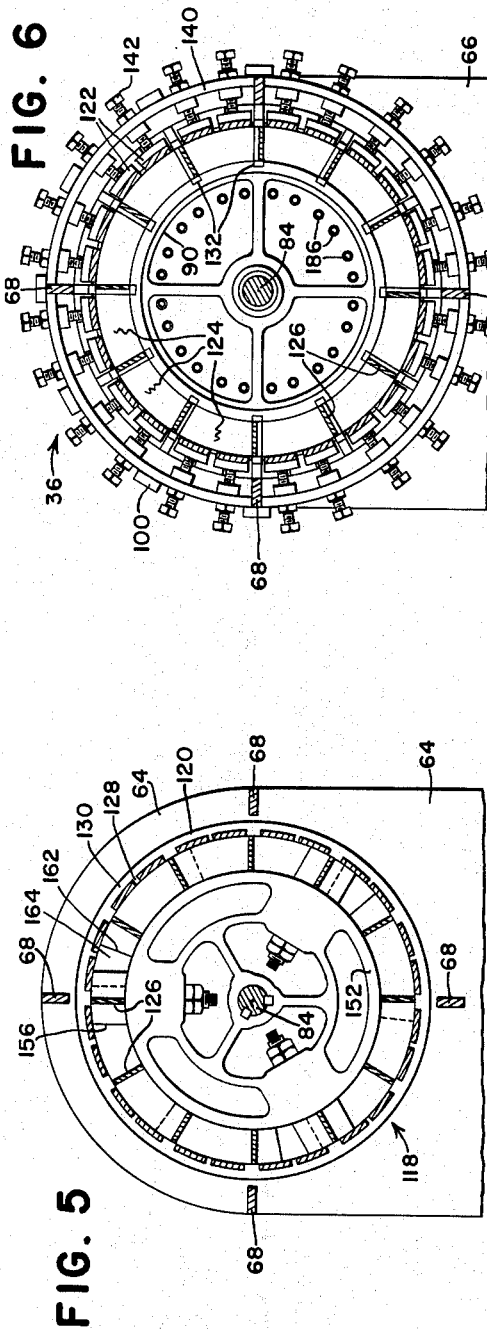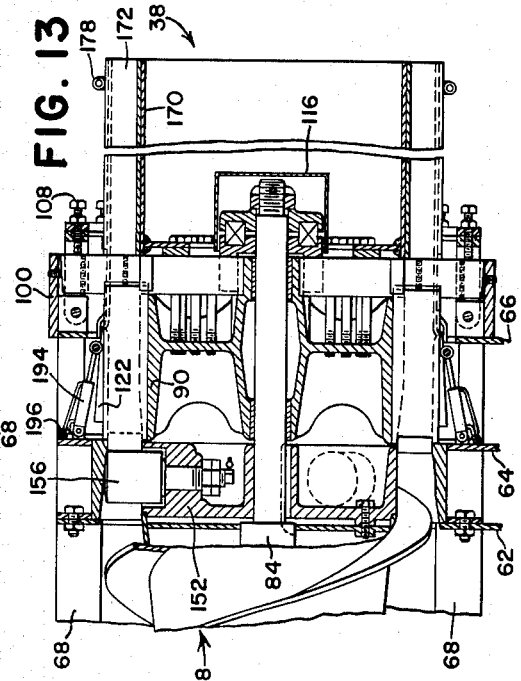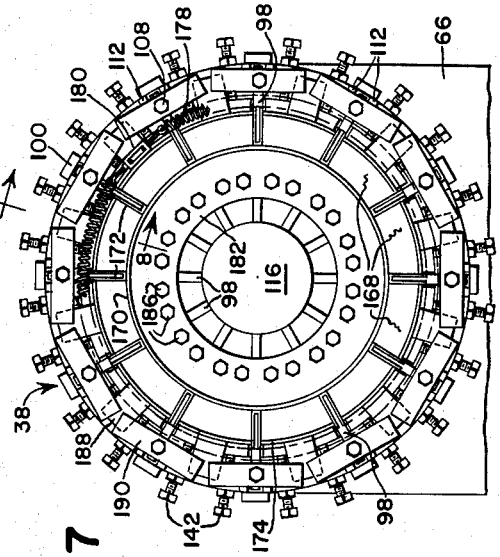
INVENTOR.
M. W. FORTH

United States Patent Office 3,218,993
Patented Nov. 23, 1965

3,218,993
MACHINE FOR WAFERING HAY AND
LIKE FORAGE CROPS
Murray W. Forth, Moline, Ill., assignor to Deere &
Company, Moline, Ill., a corporation of Delaware
Filed Dec. 6, 1962, Ser. No. 242,805
26 Claims. (Cl. 107—14)

This invention relates to a wafering machine or apparatus and more particularly to a machine of the mobile type adapted to operate over fields in which previously cut hay and like forage crops is windrowed in preparation for picking up and processing by the wafering machine.

As is understood by those versed in the art, a wafering machine operates by means of appropriate dies and other mechanism to form hay and like forage crops into relatively small cubes, cylinders and similar shapes for easy consumption, handling, storage etc. In a typical machine, the product will be on the order of 2 x 2 inches in random lengths from 1 to 6 inches; although, instances are known in which the cross-sectional areas will be somewhat smaller than those given. Wafers of this type will have a preferred density on the order of 15 to 45 pounds per cubic foot and are processed from field-cured crops having a moisture content of around 25% or less. In some cases, additional moisture may be supplied in the form of a spray distributed to the crops as it enters the feed means for the wafering die.

Desiderata for a machine of this character are mobility, flexibility, low cost and sufficient capacity to make its cost worth while in tons per hour, few if any of which requirements can be achieved simply by changing in degree certain principles developed in the conventional hay baler. Nor can the conventional pellet mill be relied upon as background, because of the wide differences in materials handled. For example, in a pellet mill, the problems are much less acute, because the material is pulverulent and of relatively uniform texture, density, etc. On the other hand, field crops are apt to vary from windrow to windrow in moisture content, type of crop and so forth and, even though various types of mechanisms have been utilized to reduce the crop to a common denominator, the fact that the crop contains leaves, stem fragments and the like requires special equipment, the most significant of which is the die means itself which must be especially designed to produce acceptable wafers.

Accordingly, it is a principal object of the present invention to provide an improved mobile wafering machine. It is a further and nonetheless significant object to provide improved die means in which the taper of the die opening may be controlled for varying the density of the wafer. A further object is to associate a plurality of die openings, preferably in the form of an annulus, and to control all die openings in the interests of obtaining wafers of uniform or near uniform density. A further important object is to provide in association with the dies a plurality of die extensions, one for and in register with each die opening whereby to increase the length of time that the product is confined in a die opening or die extension. In this respect, it is a significant object to provide each die extension in the form of relatively flexible components which will apply a degree of pressure different from that of the die opening proper.

Further important objects reside in improved means for feeding the die annulus; the use of a multi-flighted auger with the flight termini equipped respectively with rollers in association with knife-edged dividers between the die openings; the provision of a simple sturdily constructed apparatus which is inexpensive to build and easy to operate and maintain; and such other important objects and features, inherent in and encompassed by the invention, as will appear from the preferred embodiments disclosed in the ensuing description and accompanying sheets of drawings, the figures of which will be described below.

FIG. 1 is a plan view of a representative mobile wafering machine, shown attached to a tractor, portions of which are broken away in the interests of conserving space in the drawings.

FIG. 2 is an enlarged section, as seen generally along the line 2—2 of FIG. 1, illustrating the feed means, the die means and the die extension means.

FIG. 3 is a fragmentary section as seen generally along the line 3—3 of FIG. 2.

FIG. 4 is fragmentary view, with portions omitted, as seen generally along the line 4—4 of FIG. 3.

FIG. 5 is a section as seen along the line 5—5 of FIG. 2.

FIG. 6 is a section as seen along the line 6—6 of FIG. 2.

FIG. 7 is an end view as seen along the line 7—7 of FIG. 2.

FIG. 8 is an enlarged fragmentary section as seen substantially along the line 8—8 of FIG. 7.

FIG. 9 is an enlarged perspective, with portions in section and portions omitted, illustrating one of the die openings and its associated components.

FIG. 10 is a similar perspective but illustrating the extreme end of a die extension.

FIG. 11 is an enlarged view as seen generally along the line 11—11 of FIG. 2.

FIG. 12 is a section, on an enlarged scale, as seen on the line 12—12 of FIG. 2.

FIG. 13 is a sectional view of a modified form of die means.

The machine will be described first in general terms having particular reference to FIG. 1, wherein the machine is shown as comprising a main frame or support means 20 carried on relatively widely laterally spaced wheels 22 and 24 for transport via a draft tongue 26 and tractor 28 over a field of hay or like forage crops which has been previously cut and windrowed. For this purpose, the machine carries at one side thereof, by means of suitable supporting structure not material here a windrow pickup device 30 which picks up the windrow and causes it to be conveyed rearwardly through a feed housing 32 to a feed unit designated generally by the numeral 34. From this area, the crops are fed laterally or to the left as seen in the presently disclosed machine so as to be processed by die means, designated in its entirety by the numeral 36, moving ultimately leftward of the machine through die extension means 38 to a rearwardly directed conveyor 40. As is typical of machines of this character, a trailer or wagon may be towed by the vehicle for receiving the wafers or equivalent product. Since this is largely conventional, such trailing receptacle is not shown. In this case, the driven parts of the wafering apparatus are shown as being powered in the first instance from the tractor power take-off shaft, as at 42, by means of a propeller shaft 44 which enters a gear box 46 at a forward portion of the frame 20. From this point, appropriate drives are taken laterally opposite directions to the pickup means 30, as at 48, and to the conveyor 40, as at 50.

A rearward extension shaft 52 from the gear box 46 may enter a rearwardly disposed gear box 54 for transfer of the drive via a cross shaft 56 to a multi-chain and sprocket drive 58 for driving feed means, to be presently described, contained in the feed unit 34.

FIG. 2 shows a portion of the main frame or support means 20 as being provided with a plurality of upright plates 60, 62, 64 and 66. These, in conjunction with four parallel structural bars 68, afford a rigid but lightweight frame for the feed unit 34. This frame is supplemented by four steel plates 70 of arcuate section, rigidly but removably bolted in place to the bars 68 as by a plurality of bolts 72, each arcuate plate being appropriately flanged as at 74 for this purpose. One of the plates 70 is appropriately apertured (not shown) to establish a communication with the feed housing 32 so as to provide entry for crops from the housing 32 into a feed chamber 76 established by the combination of plates 70 and support bars 68. As best seen in FIG. 2, the chamber is tapered in the direction in which the material is fed, which direction is from left to right as seen in this figure. The bars 68 are welded to the plates 60, 62, 64 and 66 and these plates are in turn welded to the components of the frame structure 20.

Coaxially journaled within the feed chamber 76 is a multi-flighted auger 78 made up of a core 80 and a plurality of helical flights 82. In this case, there are three similar uniformly spaced flights. The core 80 is tapered in the opposite direction from the taper of the chamber 76. The auger is appropriately rigidly mounted on an auger shaft 84 which projects at the right-hand end of the machine (left side as seen in FIG. 2) at which point there is keyed thereto a sprocket 86 which is driven by the chain and sprocket means 58 previously described. The plate 60 nearest the sprocket 86 is provided with appropriate bearing means as at 88. The opposite end of the auger is carried by a portion of the die means, to be described below.

The die means comprises, among other things, an inner annular element 90 in which the proximate end of the auger shaft is journaled as at 92. The extreme end of the element 90, in the area in which it surrounds the auger shaft 84, is provided as a hub which has a plurality of splines 96 for rigidly mounting the inner ends of a plurality of spoke-like supports 98. These spoke radiate to outer extremities whereat they are retained against radial displacement by a plurality of extension bars 100 rigidly secured as by welding to the proximate plate or ring 66, there being one member 100 for each spoke 98. Each member is provided with a set screw 102 operative to engage the extreme end of the associated spoke. Appropriate adjustment of all set screws will center the element 90 in coaxial relationship to the remaining components.

The spokes 98 are held against axial displacement to the right as seen in FIG. 2 by a plurality of U-shaped retainers or bails 104, there being one of these for each spoke. Each is pivoted at 106 on the associated member 100 and is provided with a cap screw 108 engageable with the associated spoke 98 from the right as seen in FIG. 2 (see also FIG. 11). Each spoke has a stop screw 110 which abuts a radially inwardly extending ear 112 rigid with the associated member 100. When the screws 108 are tightened and locked, along with the action of the centering screws 102, the spokes 98 become in effect a rigid assembly with the die element 90. The auger shaft 84 extends beyond the set of spokes and is provided with an appropriate thrust bearing 114, here shown as being enclosed within a removeable sheet metal cap 116. As will be presently brought out, there are in the present case twelve die openings or cells and consequently there will be twelve spokes 98, twelve members 100, twelve bails 104 etc. These details, can, of course, be varied within wide ranges.

The inner die element 90 is concentrically surrounded by an outer die element 118 of annular construction. In the present case, this is made up of a one-piece ring-like member 120 rigidly mounted between the plates or rings 62 and 64 and having rigid thereon a plurality of axially extending arcuate tongues or fingers 122 (FIG. 9) which form outer walls for the die cells established at 124 by arcuate portions of the inner die element 90 and a plurality of radial dividers or partitions 126. For the purpose of achieving some flexibility of the tongues or walls 122, they are provided in sets of two, separated by a relatively narrow slit 128 and integral with the ring 120, although the element is annularly grooved at 130. Each pair of walls 122 is separated from its neighboring pair by a relatively wider slot so as to accommodate the radially outermost portion of the associated divider or partition 126. Each of these, as best shown in FIG. 9, is rigidly mounted in a keyway 132 in the exterior of the inner die element 90.

Each partition or divider 126 is axially adjustable relative to the die means proper by means of an adjusting screw 134 (FIG. 2) carried by its associated spoke 98. Access to the screws 134 may be had when the die extension means 38 is removed. The purpose of the axial adjustment will be brought out later. Each knife is confined against radially outward escape from its keyway 132 by means of interlocking its opposite end portions with the spokes 98, as at 136, and with the interior of the ring 120, as at 138 (FIG. 2).

The bars 68, in the extensions thereof between the plates or rings 64 and 66, rigidly carry a circumferential member or ring 140, and this is provided with a plurality of adjusting screws 142, one radially directed toward and for each of the adjustable walls or tongues 122. When the screws 142 are turned inwardly, the associated walls 122 will be forced radially inwardly toward the inner die element 90, thus reducing the cross-sectional area of the discharge end of the die cell 124 and changing the enclosed taper of the die, it being clear, from the description thus far, that each die cell 124 is made up of a pair of dividers 126, the intervening arcuate portion of the inner die element 90 and a pair of tongues 122, the latter establishing the adjustable outer walls. Having reference now to FIG. 8, it will be seen that each die cell 124 has an inlet end 144 and an outlet end 146, the material being extruded through the die cells from left to right, which is the same direction as the auger 78 feeds the material. In other words, material fed into the auger chamber 76 is moved to the right by the helical flights 82, being forced thereafter through the die cells 124 to emerge into the die extension means 38 as wafers. The length of the wafers will vary, depending upon the amount of material confined between the auger flights. As previously stated, the quantity, as well as the type, of material varies from windrow to windrow, and consequently will vary from charge to charge. That the material will be fed to and extruded from the die cells 124 as charges is evident from the fact that each of the dividers 126 is in the form of a knife, having its front edge sharpened at 148 so that the material is cut off thereat in cooperation with means on the auger 78 to be presently described.

As best shown in FIG. 12, the right-hand or outer edge of each partition or knife 126 is further located relative to its associated spoke 98 by a pair of tabs 150 welded to the spoke in spaced relation so as to confine the rear end of the associated knife.

The auger 78 is provided at its right-hand end, between its core 80 and the inner die element 90, with what may be regarded as a core extension, here in the form of an annular casting 152 provided with a plurality of cylindrical pockets 154 respectively on radial axes spaced apart 120° to conform to the number and spacing of the auger flights 82. The casting 152 journals thereon a plurality of rollers 156, one in each pocket, the rollers of course being respectively journalled on radial axes. Each roller is preferably crowned at its outer end as shown to cooperate with a comparably shaped interior surface 158 on the ring 120 so as to confine material against radial escape. Bordering each pocket 154 is an integral generally triangular shaped radial protuberance 160 which, as best seen in FIG. 4, is notched at 162 to receive the terminal end of an associated auger flight 82. The shape of the trailing surface of the protuberance 160 as at 164, establishes what may be regarded as a continuation of the auger flight, terminating at that portion of the pocket 154 that is proximate to the radial plane in which lie the knife edges 148 of the dividers or knives 126. The direction of rotation of the auger is indicated by the arrow 166 in FIGS. 2 and 3. Since the flights are right-hand, material will be conveyed from left to right as already described, being forced successively into the die cells 124 as the auger assembly rotates along with the casting 152 and rollers 156. Because of the cooperation between the rollers 156 and knife edges 148, the material will be cut off into successive charges as the rollers pass the annulus of die cells. As successive charges enter the die cells, the material is extruded from left to right from the inlet openings of the cells to the outlet openings (FIG. 8), proceeding thence into the die extension means 38, the details of which will be described below.

From the description thus far it will be seen that material entering the feed chamber 76 is forced to the right as seen in FIG. 2 by the auger 78, the flights of which terminate in the radial plane of the cutting edges 148 of the knive or dividers 126, the termini comprising the rollers 156 as previously described. The reverse tapers of the feed chamber and auger core 80 effect a certain amount of precompression of the material. The presence of the frame members 68 within the feed housing restricts the tendency of the compressed material to rotate with the auger and assures proper axial flow to the dies. As the auger continues to rotate, successive charges or quantities of the crop material are forced into the die cells 124, being ultimately extruded from the outlet ends 146 thereof as wafers. The die means 36 is relatively rigidly constructed, subject, of course, to the adjustability of the movable or adjustable outer wall portions 122. The outer surface of the inner die element 90, in portions thereof between the keyways 132 which carry the dividers 126, has a built-in taper as best seen in FIG. 8. This, in conjunction with the adjustability of the walls 122, provides a varying taper, in certain circumstances, for increasing the resistance of the passage of the crops from the inlet end to the outlet end of each die cell. It will be understood that the greater the restriction, the greater the resistance. The need for adjustment will of course vary with the density, moisture content etc. of the crops being wafered. The density of the wafers will of course depend upon the same factors, plus those introduced by frictional resistance in the die cells. Another factor affecting the density and type of the wafer is the length of time that the material remains confined in the die cells. As indicated in FIG. 8, the length of each cell is relatively short so that successive charges of crop material accumulated therein will, once the die cell is filled, emerge at the outlet end. However, for the purpose of increasing the length of time that the wafers remain under confinement, there is provided the die cell extension means 38.

As previously described, the die means 36 in this case affords twelve die cells, each having its length generally parallel to the axis of the die itself. The die extension means 38 is an extension of the die means and consequently the structure provided thereby affords one die extension chamber 168 for each die cell. The die extension structure includes an inner hollow cylinder 170 preferably of sheet steel, to which are welded twelve radial partition members 172, each of these being U-shaped in cross-section (FIG. 10). The radial members or dividers 172 afford spacers respectively in register with the partition members or knives 126, and the outer surface of the cylinder 170 is of course of the same diameter as the internal die member 90 at the outlet ends of the die cells 124 (FIG. 8). The die extension means 38 has a plurality of movable outer walls 174, also preferably formed of lightweight sheet steel. In this respect, it should be noted, for reasons that will be presently described, that the structure of the die means 38 is relatively lighter than that of the die means 36.

Each outer wall 174 is hinged at 176 to the outer ends of its associated pair of walls 122 of the associated die cell 124 and the opposite terminal ends of the walls or members 174 are confined by an annular or "garter" spring 178, the tension on which can be adjusted by a turnbuckle 180 (FIG. 7).

As best seen in FIGS. 2 and 7, the extension cylinder 170 has rigidly secured thereto, as by welding, an internal flange 182 which is reinforced by a ring 184 and rigidly but removably secured to the internal die member 90 by a plurality of relatively long cap screws 186. The core 170 is thus in effect a coaxial extension of the internal die member 90.

Each of the outer walls 174 is free to participate in radial movement at its outer end because of the combination of its hinge 176 and the manner in which it is retained against axial displacement. For this purpose, each member 174 has rigidly secured thereto as by welding adjacent to its die-proximate end an angle member 188 which is confined by one end of a transverse bar 190 mounted on the associated bail 104 (previously described) via the previously described associated adjusting screw 108 and a lock nut 192. See FIG. 11. The bar 190 extends laterally to either side of its bail so as to engage the angle members or clips 188 on a neighboring pair of members 174. The combination of the hinge mountings at 176 and the yieldable confinement by the annular spring 178, plus the relatively light structure of the extension means 30, provides yieldable axial extensions of the respective die cells 124 so that as the wafers are extruded from the die cells proper they travel a predetermined distance under confinement in the respective die cell extensions 168. The flexible structure of the die extension means allows limited expansion of the wafers and the components of the die extension means afford additional frictional resistance as the wafers ultimately are extruded at the outer open ends of the machine for receipt by the conveyor 40. Thus it will be seen that as a wafer exits from a die cell 124 and travels through the associated die cell extension 168 it may expand intermediate the ends of the die extension means and will ultimately be reconfined at the exit end of the extension because of the annular spring 178.

In the modified structure shown in FIG. 13, the basic components are substantially identical and similar reference characters are applied. The main difference here is that the walls 122 are adjustable by a plurality of small hydraulic cylinders 194, all of which may be connected in parallel as at 196. Because of the parallel hydraulic connection, all cylinders 194 will be extended or retracted in unison as distinguished from the individual adjustment of the walls 122 by the screws 142 as previously described. The operation of the apparatus has been described in conjunction with the description of its components and need not be repeated. It will be seen that the basic objectives of the invention are suitably achieved by the preferred structures illustrated. Features and advantages other than those set forth will readily occur to those versed in the art, as will many modifications and alterations therein, all without departure from the spirit and scope of the invention.

What is claimed is:

1. A machine for wafering hay and like forage crops, comprising: support means; a die annulus carried by the support means and including inner and outer concentric annular elements and a plurality of uniformly circumferentially spaced dividers carried by the inner element and extending radially outwardly to the outer element to provide an annular row of similar die cells generally parallel to the axis of the annulus and opening in axially opposite directions respectively as inlet and outlet ends, said inner element being a continuous rigid ring having an axial dimension substantially equal to the length of a die cell, said outer element having a continuous ring-like portion of relatively narrow axial dimension as compared with said ring and surrounding and retaining the dividers at the inlet ends of the cells, said outer element further having a plurality of separate outer walls, one for and extending endwise of each cell and lying between neighboring dividers, each outer wall having opposite ends respectively at the inlet and outlet ends of its cell; means mounting the outer walls on said ring-like portion at their ends adjacent to the inlet ends of the cells for radial inward and outward movement of their opposite ends so as to vary the cross-sectional areas of the respective cells at their outlet ends; means for adjusting said opposite ends of the walls radially inwardly and for resisting radial outward movement thereof as crops pass through the cells; and means for feeding crops to the inlet ends of the cells for extrusion of such crops through said outlet ends.

2. The invention defined in claim 1, including: die extension means including a cylinder structure having substantially the same diameter as the inner element and coaxially mounted on said inner element, and means spaced externally about said cylinder structure and comprising an annular row of die cell extensions, one for each die cell, in axial register respectively with the outlet ends of the cells for receiving extruded crops, each extension including at least one member providing contact with such extruded crop.

3. The invention defined in claim 1, including: die extension means including a cylinder structure having substantially the same diameter as the inner element and coaxially mounted on said inner element, and means spaced externally about said cylinder structure and comprising an annular row of die cell extensions, one for each die cell, in axial register respectively with the outlet ends of the cells for receiving extruded crops, each extension including a plurality of members constructed and arranged to conform substantially to the shape of its cell.

4. The invention defined in claim 3, in which: at least one member of each extension is adjustable in a portion thereof relative to its companion members and independently of the outer wall of its cell for varying the resistance of the extension to the passage of extruded crops therethrough.

5. The invention defined in claim 4. in which: each adjustable extension member is hingedly connected to its respective cell outer wall.

6. The invention defined in claim 1, in which: the feeding means includes a feed chamber coaxial with the annulus and having an annular outer wall provided with a delivery portion coaxially adjoining and of substantially the same diameter as the outer annular element at the inlet ends of the cells, and an auger coaxially journaled in the chamber and having a core provided with a delivery portion coaxially adjoining and of substantially the same diameter as the inner annular element at the inlet ends of the cells and a helical flight carried by and about said core and having a terminal delivery end generally in the radial plane of the inlet ends of the cells.

7. The invention defined in claim 6, in which: the delivery end of the helical flight includes a rotatable member journaled on the core on an axis radial to the core axis, said member having a peripheral portion formed about said radial axis and generally tangent to the radial plane of the inlet ends of the cells.

8. The invention defined in claim 1, in which: the feeding means includes a feed chamber coaxial with the annulus and having an annular outer wall provided with a delivery portion coaxially adjoining and of substantially the same diameter as the outer annual element at the inlet ends of the cells, and an auger coaxially journaled in the chamber and having a core provided with a delivery portion coaxially adjoining and of substantially the same diameter as the inner annular element at the inlet ends of the cells and a plurality of helical flights carried by and about said core and having terminal delivery ends generally in the radial plane of the inlet ends of the cells.

9. The invention defined in claim 8, in which: the delivery end of each helical flight includes a rotatable member journaled on the core on an axis radial to the core axis, each member having a peripheral portion formed about its radial axis and generally tangent to the radial plane of the inlet ends of the cells.

10. The invention defined in claim 9, in which: said dividers respectively have knife-like edges directed toward said radial plane and are selectively adjustable axially of said inner element and relative to said radial plane for cooperation with said rotatable members.

11. A machine for wafering hay and like forage crops, comprising: support means; a die annulus carried by the support means and including inner and outer concentric annular elements and a plurality of uniformly circumferentially spaced plate-like dividers carried by the inner element and extending radially outwardly to the outer element to provide an annular row of similar die cells of substantially rectangular cross-section generally parallel to the axis of the annulus and opening in axially opposite directions respectively as inlet and outlet ends; means for feeding crops to the inlet ends of the cells for extrusion of such crops through said outlet ends; and die extension means including a drum-like cylinder structure having substantially the same diameter as the inner element and coaxially mounted on said inner element, and means externally about said cylinder structure and comprising an annular row of die cell extensions, one for each cell, in axial register respectively with the outlet ends of the cells for receiving extruded crops, each extension including at least one member providing contact with such extruded crop.

12. The invention defined in claim 11, in which: at least one member of each extension is adjustable in a portion thereof relative to its companion members for varying the resistance of the extension to the passage of extruded crops therethrough.

13. The invention defined in claim 11, in which: the feeding means includes a feed chamber coaxial with the annulus and having an annular outer wall provided with a delivery portion coaxially adjoining and of substantially the same diameter as the outer annular element at the inlet ends of the cells, and an auger coaxially journaled in the chamber and having a core provided with a delivery portion coaxially adjoining and of substantially the same diameter as the inner annular element at the inlet ends of the cells and a helical flight carried by and about said core and having a terminal delivery end generally in the radial plane of the inlet ends of the cells.

14. The invention defined in claim 11, in which: the feeding means includes a feed chamber coaxial with the annulus and having an annular outer wall provided with a delivery portion coaxially adjoining and of substantially the same diameter as the outer annular element at the inlet ends of the cells, and an auger coaxially journaled in the chamber and having a core provided with a delivery portion coaxially adjoining and of substantially the same diameter as the inner annular element at the inlet ends of the cells and a plurality of helical flights carried by and about said core and having terminal delivery ends generally in the radial plane of the inlet ends of the cells.

15. The invention defined in claim 14, in which: the delivery end of each helical flight includes a rotatable member journaled on the core on an axis radial to the core axis, each member having a peripheral portion formed about its radial axis and generally tangent to the radial plane of the inlet ends of the cells.

16. The invention defined in claim 15, in which: said dividers respectively have knife-like edges directed toward said radial plane and are selectively adjustable axially of said inner element and relative to said radial plane for cooperation with said rotatable members.

17. A machine for wafering hay and like forage crops, comprising: support means; a die annulus carried by the support means and including inner and outer concentric annular elements and a plurality of uniformly circumferentially spaced dividers carried by one element and extending radially to the other element to provide an annular row of similar die cells generally parallel to the axis of the annulus and opening in axially opposite direcsions respectively as inlet and outlet ends, said other element being made up of a plurality of separate walls, one for and extending endwise of each cell and lying between neighboring dividers, each such wall having opposite ends respectively at the inlet and outlet ends of its cell; means mounting said walls at their ends adjacent to the inlet ends of the cells for radial inward and outward movement of their opposite ends so as to vary the cross-sectional areas of the respective cells at their outlet ends; means for adjusting said opposite ends of the walls radially toward said one element and for resisting radially opposite movement thereof as crops pass through the cells; and means for feeding crops to the inlet ends of the cells for extrusion of such crops through said outlet ends.

18. A machine for wafering hay and like forage crops, comprising: support means; a die annulus including an annular row of die cells of rectangular cross section and spaced apart uniformly circumferentially about the axis of said annulus and generally parallel to said axis, said cells opening at one radial side of said annulus to inlet ends lying in a common radial plane and said cells opening at the opposite radial side of said annulus to outlet ends; feed means carried by the support means and including an annular feed chamber coaxially adjoining the annulus at and leading to the inlet ends of the cells, a rotatable member coaxially journaled in the chamber adjacent to said inlet ends and including a plurality of uniformly angularly spaced rollers carried by the member respectively on radial axes so as to traverse the inlet ends of the cells as said member rotates, each roller being substantially equal in height to the radial dimension of the cells and having its surface substantially tangent to said radial plane, and an auger coaxially rotatable with said member and having a plurality of helical flights having terminal end portions respectively proximate to said rollers at portions of said rollers that are respectively proximate to said radial plane, and each terminal end portion being substantially coextensive in height with its roller.

19. The invention defined in claim 18, in which: each die cell is made up of a plurality of wall parts, one of which for each cell has a knife-like edge at said radial plane for cooperation with said rollers.

20. The invention defined in claim 19, in which: each of said walls having the knife-like edge is selectively axially adjustable relative to said radial plane.

21. The invention defined in claim 18, in which: said chamber includes a generally annular wall in surrounding relation to the auger, and a plurality of circumferentially spaced members arranged along said wall and fixed relative thereto and running lengthwise of said chamber as respects the auger axis.

22. A machine for wafering hay and like forage crops, comprising: means providing a die cell having opposite inlet and outlet ends and means for feeding successive charges of crops to said cell at the inlet end thereof for extrusion therethrough to exit at said outlet end, said means providing the die cell including relatively rigid wall means capacitated to withstand crop pressures laterally of the length thereof, said wall means including a wall part selectively adjustable to vary the cross-sectional area of the cell in the zone of the outlet end thereof so as to vary the resistance of the cell to passage of crop charges therethrough; die cell extension means disposed in register with said outlet end and providing a continuation of said cell, said extension means having a length materially greater than that of said cell for accumulating a plurality of charges exiting from said outlet end, and said die cell extension means including walls having at least a portion thereof capable of yielding to lateral crop pressures in charges accumulated therein, and said portion being adjustable crosswise of said extension and independently of said cell wall part.

23. A machine for wafering hay and like forage crops, comprising: support means; a die annulus carried by the support means and including a single annular row of wafering die cells spaced apart uniformly circumferentially about the axis of said annulus and generally parallel to said axis and each cell being of rectangular cross section and having an axial dimension greater than its radial and circumferential dimensions, said cells opening in axially opposite directions respectively as inlet and outlet ends, said inlet ends lying in a common radial plane; feed means carried by the support means coaxially with the annulus at and leading to said inlet ends of the cells for feeding crops to said cells for compression therein and extrusion therethrough to exit as wafers at said outlet ends, said feed means including a helical flight having a terminal end substantially at said radial plane and said terminal end having a radial dimension substantially equal to that of the inlet end of a die cell.

24. A machine for wafering hay and like forage crops, comprising: support means; a die annulus carried by the support means and including a single annular row of wafering die cells spaced apart uniformly circumferentially about the axis of said annulus and generally parallel to said axis and each cell being of rectangular cross section and having an axial dimension greater than its radial and circumferential dimensions, said cells opening in axially opposite directions respectively as inlet and outlet ends, said inlet ends lying in a common radial plane; feed means carried by the support means coaxially with the annulus at and leading to said inlet ends of the cells for feeding crops to said cells for compression therein and extrusion therethrough to exit as wafers at said outlet ends, said feed means including a plurality of helical flights having terminal ends substantially at said radial plane, each terminal end having a radial dimension substantially equal to that of the inlet end of a die cell.

25. A machine for wafering hay and like forage crops, comprising: support means; a die annulus carried by the support means and including a single annular row of wafering die cells spaced apart uniformly circumferentially about the axis of said annulus and generally parallel to said axis and each cell being of rectangular cross section and having an axial dimension greater than its radial and circumferential dimensions, said cells opening in axially opposite directions respectively as inlet and outlet ends, said inlet ends lying in a common radial plane; feed means carried by the support means and including an annular feed chamber coaxial with the annulus at and leading to said inlet ends of the cells and an auger coaxially and rotatably carried within the chamber for feeding crops to said cells for compression therein and extrusion therethrough to exit as wafers at said outlet ends, said auger including a helical flight having a terminal end substantially at said radial plane and said terminal end having a radial dimension substantially equal to that of the inlet end of a die cell.

26. A machine for wafering hay and like forage crops, comprising: support means; a die annulus carried by the support means and including a single annular row of wafering die cells spaced apart uniformly circumferentially about the axis of said annulus and generally parallel to said axis, said cells opening in axially opposite directions respectively as inlet and outlet ends, said inlet ends lying in a common radial plane; feed means carried by the support means and including an annular feed chamber coaxial with the annulus at and leading to said inlet ends of the cells and an auger coaxially and rotatably carried within the chamber for feeding crops to said cells for compression therein and extrusion therethrough to exit as wafers at said outlet ends, said auger including a plurality of helical flights having terminal ends substantially at said radial plane, each terminal end having a radial dimension substantially equal to that of the inlet end of a die cell.

References Cited by the Examiner
UNITED STATES PATENTS

| | | | |
|---|---|---|---|
| 2,005,689 | 6/1935 | Hall | 107—14 |
| 2,583,600 | 1/1952 | Schreiber | 107—14 |
| 2,958,900 | 11/1960 | Meakin | 18—12 |
| 3,006,272 | 10/1961 | Brady | 100—93 |
| 3,063,361 | 11/1962 | Gehrke | 100—98 |

FOREIGN PATENTS

| | | |
|---|---|---|
| 1,250,174 | 11/1960 | France. |
| 612,143 | 11/1948 | Great Britain. |

OTHER REFERENCES

Western Livestock Journal Magazine, April 1961, pages 36 and 39 (copy available in Class 100, unofficial subclass, Pellet makers-rotary).

WALTER A. SCHEEL, *Primary Examiner.*

LOUIS O. MAASSEL, *Examiner.*